(12) United States Patent
Abe

(10) Patent No.: US 7,743,806 B2
(45) Date of Patent: Jun. 29, 2010

(54) NON-PNEUMATIC TIRE

(75) Inventor: Akihiko Abe, Tachikawa (JP)

(73) Assignee: Bridgestone Corporation, Tokyo (JP)

( * ) Notice: Subject to any disclaimer, the term of this patent is extended or adjusted under 35 U.S.C. 154(b) by 101 days.

(21) Appl. No.: 11/860,022

(22) Filed: Sep. 24, 2007

(65) Prior Publication Data

US 2008/0073014 A1    Mar. 27, 2008

(30) Foreign Application Priority Data

Sep. 25, 2006    (JP)    ............................. 2006-259121

(51) Int. Cl.
*B60C 7/14*    (2006.01)
(52) U.S. Cl. .............................. 152/21; 152/29; 152/40; 152/88; 152/246; 152/247
(58) Field of Classification Search .................... 152/17, 152/21–25, 29–32, 40, 53, 54, 87, 88, 94, 152/246, 247, 251, 252
See application file for complete search history.

(56) References Cited

U.S. PATENT DOCUMENTS

| 942,939 | A | * | 12/1909 | Selley | 152/88 |
| 1,106,963 | A | * | 8/1914 | Nutting | 152/37 |
| 1,132,127 | A | * | 3/1915 | Sipe et al. | 152/25 |
| 1,164,529 | A | * | 12/1915 | Koch | 152/89 |
| 1,173,949 | A | * | 2/1916 | Gilliland | 152/89 |
| 1,258,042 | A | * | 3/1918 | Pfleumer | 152/246 |
| 1,365,016 | A | | 1/1921 | Allen | |
| 1,422,818 | A | * | 7/1922 | Benjamins | 152/247 |
| 1,484,580 | A | * | 2/1924 | Stitzel | 152/25 |
| 1,494,849 | A | * | 5/1924 | Lister | 152/2 |
| 3,435,872 | A | * | 4/1969 | Johnson | 152/158 |

FOREIGN PATENT DOCUMENTS

| EP | 607892 A1 | * | 7/1994 |
| GB | 129907 | | 7/1919 |
| GB | 139831 | | 3/1920 |

* cited by examiner

*Primary Examiner*—Russell D Stormer
(74) *Attorney, Agent, or Firm*—Sughrue Mion, PLLC

(57) ABSTRACT

A non-pneumatic tire having a rim member 1, a ring member 3 disposed at an outer circumferential side of the rim member 1 and provided with a tread 2 on a circumferential face, and a plurality of link mechanisms 4 coupling the rim member with the ring member. Each of the link mechanisms 4 contains a pair of link members 7a, 7b formed of a link 5a, 5b which is connected at a first end with a side portion of the rim member 1 and which is swingable in the circumferential and meridian directions and another link 6a, 6b which is connected at a first end with a side portion of the ring member and 3 which is swingable in the circumferential and meridian directions with second ends of the links being hingedly connected one another to make the links swingable in the meridian direction. A spring member 9 imparting a stiffness against relative displacements in the radian, circumferential and width directions with respect to the rim and ring members 1, 3 is provided on the link mechanisms 4.

3 Claims, 8 Drawing Sheets

FIG. 7
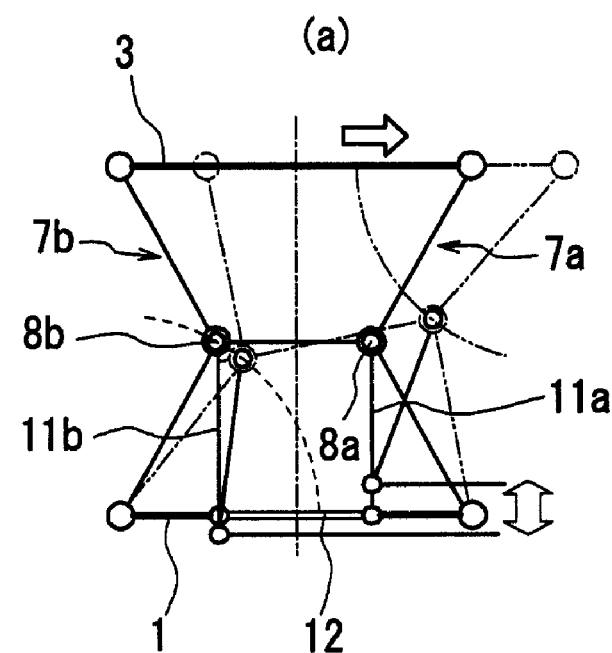
(a)
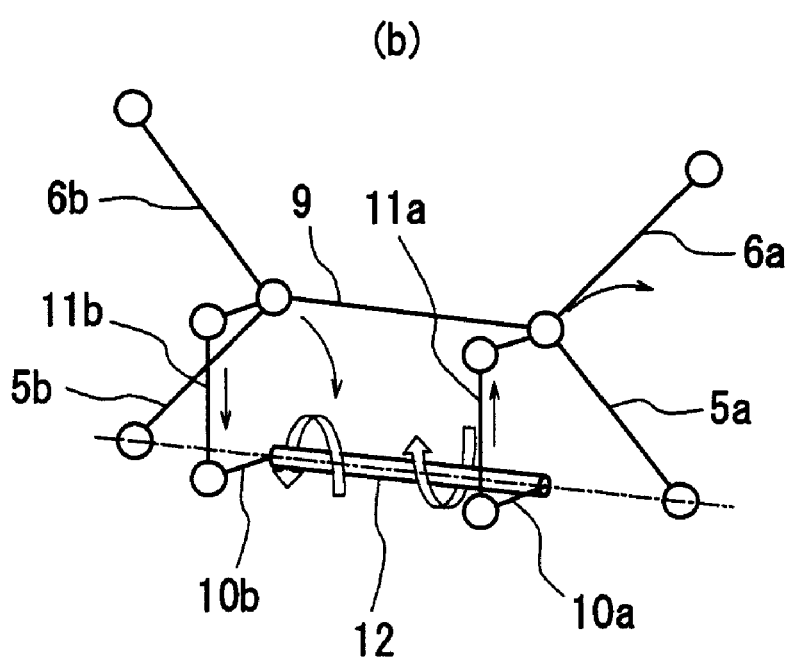
(b)

NON-PNEUMATIC TIRE

TECHNICAL FIELD

The present invention relates to a non-pneumatic tire. More particularly, the present invention proposes a technique capable of eliminating a necessity of filling a pressurized air and easily providing vertical, longitudinal and lateral stiffnesses of required magnitudes to a tire.

RELATED ART

A pneumatic tire is a widely and commonly used for motor vehicles and the like, but it has an unavoidable drawback that filled-air pressure is decreased and even lost due to a puncture or the like.

DISCLOSURE OF THE INVENTION

Problems to be Solved by the Invention

In view of this drawback, various kinds of non-pneumatic tires which can eliminate a necessity of filling a pressurized air have been proposed. One example of such a non-pneumatic tire is a solid tire having a solid structure, but it involves another drawbacks of increasing both of the weight and hardness, so that, as compared with a pneumatic tire, sufficient riding comfort and driveability cannot be secured and rolling resistance is increased. Thus, the solid tire has not been commonly used except for a special application.

In addition, although vertical, longitudinal and lateral stiffnesses of a conventional pneumatic tire, which are important characteristics of the tire, can be adjusted to a certain extent according to a characteristic of a vehicle and/or a desire of a driver, each of these stiffnesses is difficult to be independently changed to a large extent as desired. Therefore, a characteristic of a pneumatic tire is not optimized in most cases. It is noted that the term "stiffness" as used herein refers to a magnitude of elasticity against a shear deformation.

The present invention addresses to solve these drawbacks which conventional techniques encompasses, and its object is to provide a pneumatic tire which can eliminate a necessity of filling a pressurized air or other gases to obviate a possibility of decrease or loss of the internal pressure of the tire and can easily provide desired vertical, longitudinal and lateral stiffnesses in a mutually independent state.

Means for Solving the Problem

One aspect of a non-pneumatic tire according to the present invention comprises a rim member, a ring member disposed at an outer circumferential side of the rim member and provided with a tread on a circumferential face, and a plurality of link mechanisms circumferentially spaced at a given distance and coupling the rim member with the ring member, wherein each of the link mechanisms consists of a pair of link members aligned, for example, in a meridian direction, each of the link members consists of a link which is connected at a first with a side portion of the rim member and which is swingable in the circumferential and meridian directions, for example, by a universal joint, and another link which is connected at a first end with a side portion of the ring member and which is swingable in the circumferential and meridian directions, for example, by a universal joint, with respective second ends of the links being hingedly connected one another to make the links swingable in the meridian direction, and one or more kinds of elastic means imparting a stiffness against relative displacements in the radian, circumferential and width directions with respect to the rim and ring members is provided on the link mechanisms.

In this connection, one of the elastic means preferably consists of a spring member such as a rubber elastic body, a coil spring or an air spring which connects respective hinge connections of the second ends of the links of the pair of link members with each other and which has a natural length under an unloaded condition. More preferably, in addition to the spring member, another one of the elastic means consists of a torsion spring member which is arranged at a connection of the first end of at least one of the links of the link members and which imparts a stiffness against swing displacements of the link in the circumferential direction. Thus, the torsion spring member may be arranged at the connections of the first ends of the both links of the link members.

In addition to the one elastic member or to the one elastic means and the another elastic means, the tire is preferably provided with a further elastic means consisting of a torsion bar disposed between the respective hinge connections of the second ends of the links of the pair of link members via a pair of connecting rods having moment arms.

Another aspect of a non-pneumatic tire according to the present invention comprises a rim member, a ring member disposed at an outer circumferential side of the rim member and provided with a tread on a circumferential face, and a plurality of link mechanisms circumferentially spaced at a given distance and coupling the rim member with the ring member, wherein each of the link mechanisms consists of a pair of link members aligned, for example, in a meridian direction, each of the link members consists of a link which is connected at a first end with a side portion of the rim member and which is swingable in the circumferential and meridian directions and another link which is connected at a first end with a side portion of the ring member and which is swingable in the circumferential and meridian directions, with respective second ends of the links being hingedly connected one another to make the links swingable in the meridian direction, and a torsion spring member imparting a stiffness against swing displacements of the links in the meridian direction is disposed between the respective hinge connections of the second ends of the links of the pair of link members.

The tire preferably has another torsion spring member which is arranged at a connection of the first of at least one of the links of the link members and imparts a stiffness against swing displacements of the link in the circumferential direction. A torsion bar is preferably disposed between the respective hinge connections of the second ends of the links of the pair of link members via a pair of connecting rods having moment arms.

Further aspect of a non-pneumatic tire according to the present invention comprises a rim member, a ring member disposed at outer circumferential side of the rim member and provided with a tread on a circumferential face, and a plurality of link mechanisms circumferentially spaced at a given distance and coupling the rim member with the ring member, wherein each of the link mechanisms consists of a pair of link members, each of the link members consists of a link which is connected at a first end with a side portion of the rim member and which is swingable in the circumferential and meridian directions and another link which is connected at a first end with a side portion of the ring member and which is swingable in the circumferential and meridian directions, with respective second ends of the links being hingedly connected one another to make the links swingable in the meridian direction, an elastic means imparting a stiffness against relative displacements in the radian, circumferential and width directions with respect to the rim and ring members is provided on the link mechanisms, and a torsion bar is disposed between the respective hinge connections of the second ends of the links of the pair of link members via a pair connecting rods having a moment arm.

In this tire, the elastic means preferably consists of a torsion spring member which is arranged at a connection of the first end of at least one of the links of the link members and which imparts a stiffness against swing displacements of the link in the circumferential and meridian directions. In this case, the elastic means consisting of the torsion spring may thus be arranged at connections of the first ends of the both links of the link members.

Instead of the above-mentioned manner, the elastic means may consist of a torsion spring member which is arranged at a connection of the first end of either one of the link of the link members and which imparts a stiffness against swing displacements of the link in the circumferential direction, and another torsion spring member which is arranged at a connection of the first end of the other link of the link members and which imparts a stiffness against swing displacements of the link in the meridian direction.

EFFECT OF THE INVENTION

According to the first aspect of the non-pneumatic tire of the present invention, one ore more kinds of elastic means imparting a required stiffness against relative displacements in the radian, circumferential and width directions with respect to the rim and ring members is provided on the link mechanisms consisting of the pair of link members which are aligned, for example, in the meridian direction and which connect the rim member with the ring member on which the tread is formed. This can eliminate a necessity of filling an air pressure or any other internal pressure into the tire provided with a tread on the circumferential face of the ring member, and can easily provide vertical, longitudinal and lateral stiffnesses of required magnitudes to the tire on the basis of a pre-selected elastic force and according to the amount of the displacement from the neutral position, with the stiffnesses being independent with each other.

When one of the elastic means consists of a spring member which connects respective hinge connections of the second ends of the links of the pair of link members with each other and which has a natural length under a unloaded condition, the various required stiffnesses can be effectively exerted by the spring member.

That is, under an action of a vertical load on the tire, a compressive or tensile reactive force is produced on the spring member by a displacement of the link member in the compressive direction in the grounding surface side of the tire tread due to a displacement of the ring member approaching to the rim member, so that a required vertical stiffness can be exerted on the tire. On the other hand, under an action of a longitudinal load on the tire, a tensile or compressive reactive force is produced on the spring member by a relative displacement of the link member in the elongation direction in the grounding surface side due to a relative displacement of the ring member in a leading or lagging phase with respect to the rim member, so that a required longitudinal stiffness can be exerted on the tire. Further, under a lateral load on the tire, a tensile or compressive reactive force is produced on the spring member by an increase of the distance between the pair of link members and the hinge connection due to a relative displacement of the ring member in the width direction of the rim member, so that a required lateral stiffness can be exerted on the tire.

In such a tire, when another one of the elastic means consisting of a torsion spring member such as a torsion spring or a rubber bushing which is arranged at the connection of the first end of at least one of the link of the link members and which imparts a stiffness against swing displacements of the link in the circumferential direction is provided in addition to the above-mentioned spring means, the longitudinal stiffness of the tire can be selectively enhanced under an action of the torsion spring member.

Moreover, when there is provided a further elastic means consisting of a torsion bar disposed between the hinge connection of the second ends of the links of the pair of link members via a pair of connecting rods having moment arms, the lateral stiffness of the tire can be selectively increased by a torsional force applied to the torsion bar via the moment arm due to a mutual change of the radial position of the above-mentioned hinge connection or, in other words, the radial height of the hinge connection from the rim member on the occasion of a relative displacement of the ring member in the width direction caused by the action of a lateral load to the tire.

According to the second aspect of the non-pneumatic tire of the present invention, particularly a torsion spring member imparting a stiffness against swing displacements of the links in the meridian direction is disposed between the respective hinge connections of the second ends of the links of the pair of link members constituting the link mechanism, so that the torsion spring member on the hinge connections can effectively exert the stiffnesses of the magnitudes according to the amounts of the swing displacements of the links from the neutral position against relative displacements in the radial, circumferential and width directions of the tire.

Namely, the torsion spring members disposed between the hinge connecting potions of the link members can impart required stiffnesses on the basis of, in case of a relative displacement of the ring member and the rim member in the radial direction, the swing displacements of the links in the direction to which the link member is compressively deformed, and, in case of a relative displacement of the ring member and rim member in the circumferential direction, the swing displacements of the links in the direction to which the link member is expansively deformed. Also, in the case of a relative displacement of the ring member and the rim member in the width direction, the torsion spring members can impart required lateral stiffness on the basis of the change of the crossing angle of the links due to the link member being deformed in the width direction without deformations in either of the compressive or extensive direction.

In such a tire, when another torsion spring member imparting a stiffness against the swing displacement of the link in the circumferential direction is added at the connection of the first end of at least one of the links of the link members, the longitudinal stiffness of the tire alone can be selectively enhanced, as mentioned above. When the torsion bar is disposed between the respective hinge connections of the second ends of the links of the pair of link members via the pair of connecting rods having movement arms, the lateral stiffness of the tire alone can be selectively enhanced, as mentioned above.

According to the third aspect of the non-pneumatic tire of the present invention, particularly an elastic means imparting a stiffness against relative displacements of the rim and ring members in the radial and circumferential directions is provided on the link mechanism and a torsion bar is additionally disposed between the respective hinge connections of the second ends of the links of the pair of link members via the pair of connecting rods having the moment arms, so that the required vertical and longitudinal stiffnesses can be imparted to the tire under the action of the elastic means as well as the required lateral stiffness can be provided to the tire under the action of the torsion bar.

In such a tire, when the elastic means consists of a torsion spring member which is arranged at the connection of the first end of at least one of the links of the link members and which imparts a stiffness against the swing displacement in the meridian and circumferential directions, the vertical and longitudinal stiffnesses can be adjusted as required with the small number of the arranged elastic means. This is especially effective for a case where torsion spring members constituting the elastic means are arranged at the connections of the first ends of both links.

In the meantime, when the elastic means consists of a torsion spring member which is arranged at the connection of the first end of either one of the link of each link members and which imparts a stiffness against the swing displacement of the link in the meridian direction, and another torsion spring member which is arranged at the connection of the first end of the other link and which imparts a stiffness against the swing displacement of the link in the circumferential direction to, thereby, separate the function of the torsion springs, each of the vertical and longitudinal stiffnesses of the tire can be easily adjusted as desired in a mutually independent state.

BRIEF DESCRIPTION OF THE DRAWINGS

FIG. 2(*b*) is a perspective view of the non-pneumatic tire shown in FIG. 1 with the ring member being removed from the tire;

FIG. 7 is an illustrative diagram for explaining an action of the torsion bar.

DESCRIPTION OF SYMBOLS

| | |
|---|---|
| 1 | rim member |
| 2 | tread |
| 3 | ring member |
| 4 | link mechanism |
| 5a, 5b, 6a, 6b | link |
| 7a, 7b | link member |
| 8a, 8b | hinge connection |
| 9 | spring member |
| 10a, 10b | moment arm |
| 11a, 11b | connecting rod |
| 12 | torsion bar |
| 13 | segment |
| 14 | elastic ring |

BEST MODE FOR CARRYING OUT THE INVENTION

Figure 1:
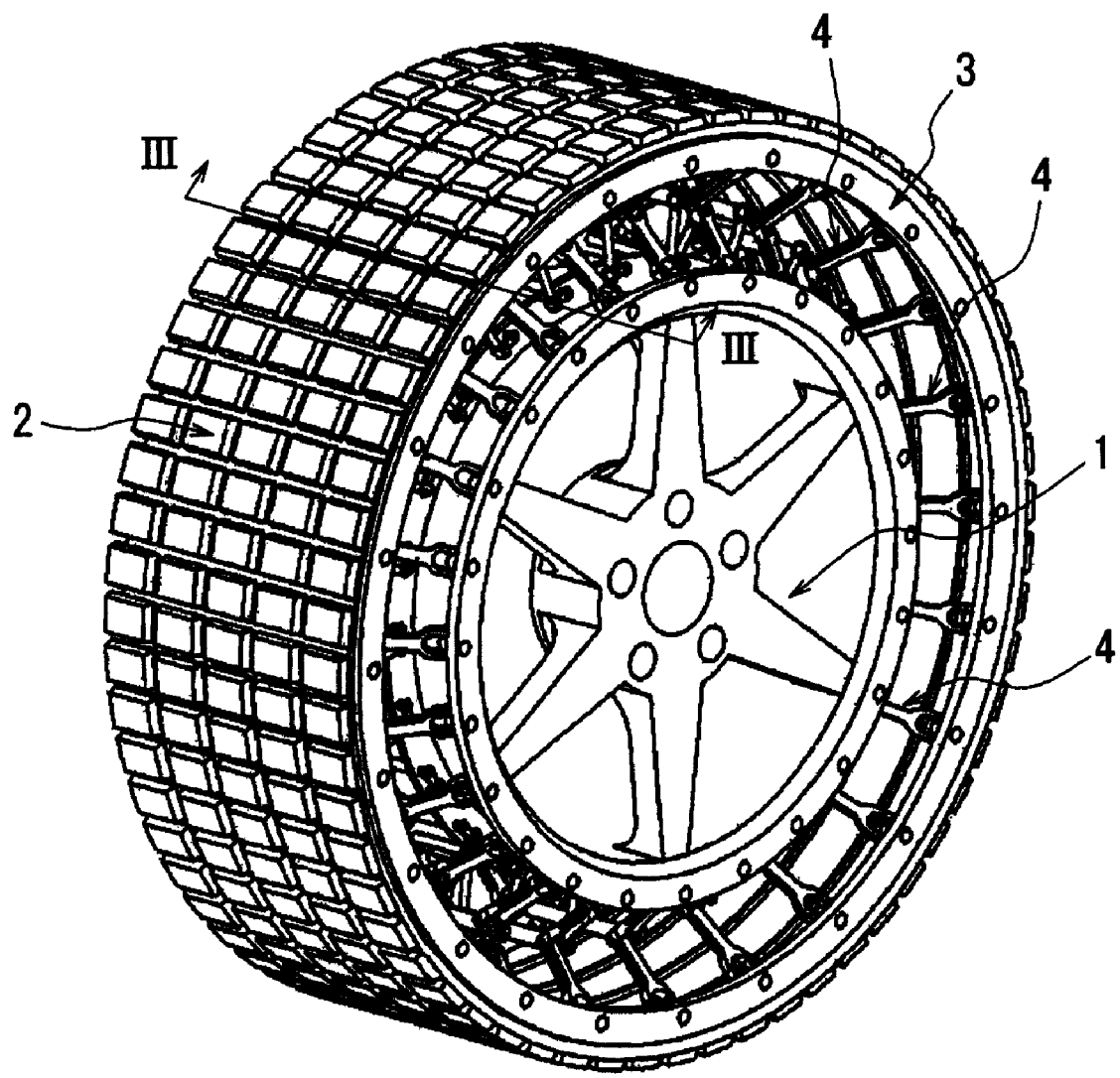
FIG. 1 is a perspective view schematically showing one embodiment of a non-pneumatic tire according to the present invention.

Referring to FIG. 1, the illustrated tire has a rim member 1 equipped with a connection to an axle, a ring member 3 disposed at outer circumferential side of the rim member 1 and provided with a tread 2 on a circumferential face (in this embodiment, an integrated ring which may be made of a metal material such as aluminum and aluminum alloy), and a plurality of link mechanisms 4 circumferentially spaced at a given distance and coupling the rim member 1 and the ring member 3.

Figure 3:
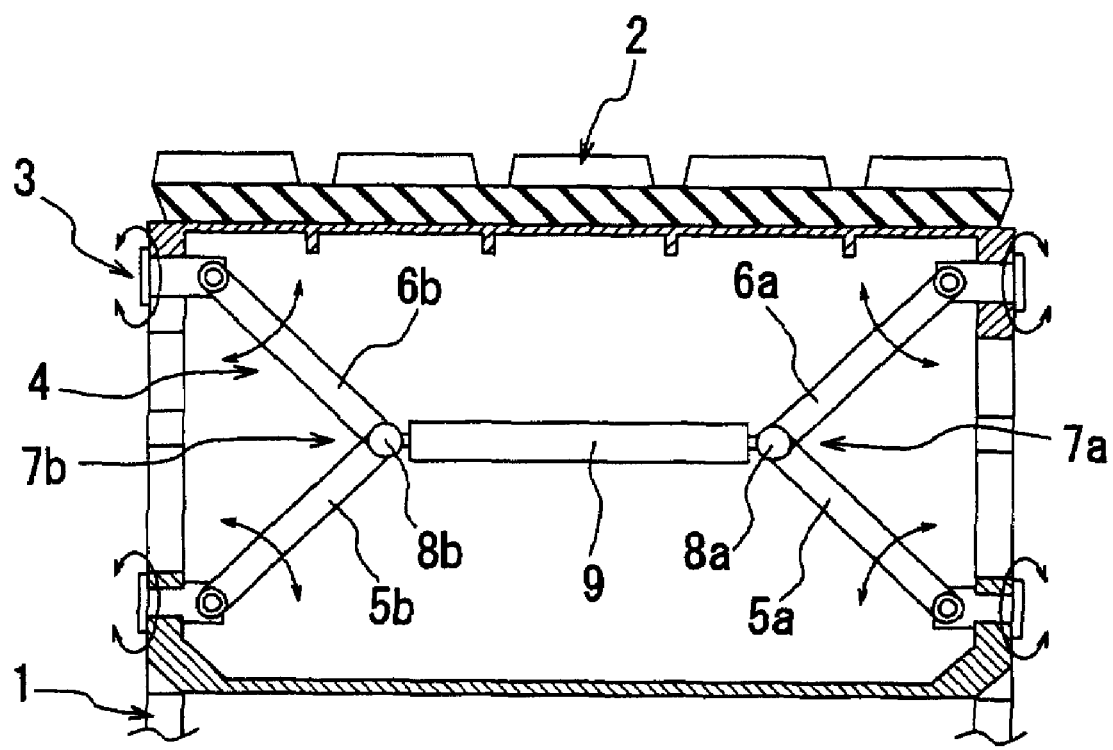
FIG. 3 is a sectional view as viewed along the line III-III of FIG. 1 shown in the state where one elastic means consists of a spring member.

Referring now to FIG. 3 which shows a section as viewed along the line III-III of FIG. 1, each of the link mechanisms 4 consists of a pair of link members 7*a*, 7*b* aligned in a meridian direction, and the link members 7*a*, 7*b* consist of links 5*a*, 5*b*, respectively, which are connected at a first end with side portions of the rim 1 member and which are swingable in the circumferential and meridian directions of the tire, and another links 6*a*, 6*b*, respectively, which are connected at a first end with side portions of the ring member 3 and which are also swingable in the circumferential and meridian directions with respective second ends of the links being hingedly connected one another to make the links 5*a* and 6*a*, 5*b* and 6*b* swingable in the meridian direction.

In this tire, the above-mentioned link mechanisms 4 are provided with one or more kinds of elastic means imparting a stiffness against relative displacements in the radian, circumferential and width directions with respect to the rim member 1 and the ring member 3. The elastic means shown in FIG. 3 consists of a spring member 9 such as a rubber elastic body, a coil spring, an air spring or a rubber elastic body reinforced with fiber connecting hinge connections 8*a*, 8*b* of the second ends of the links 5*a* and 6*a*, 5*b* and 6*b* of the pair of link members 7*a*, 7*b*, respectively, with each other.

The spring member 9 has a natural length at which neither a compressive reaction force and a tensile reaction force is produced under an unloaded condition of the tire. For example, when the rim member 1 and the ring member 3 approach with each other in the radial direction immediately under the load as shown by an imaginary line in FIG. 4(*a*), a required vertical stiffness is produced by a compressive reaction force due to a compressive deformation of the spring member 9. When the rim member 1 and the ring member 3 are relatively displaced in the circumferential direction as shown in FIG. 4(*b*), a required longitudinal stiffness is produced by a tensile reaction force due to a tensile deformation of the spring member 9 cause by an elongation of the entire length of the link mechanisms 4 or, directly, the link members 7*a*, 7*b*.

Figure 4:
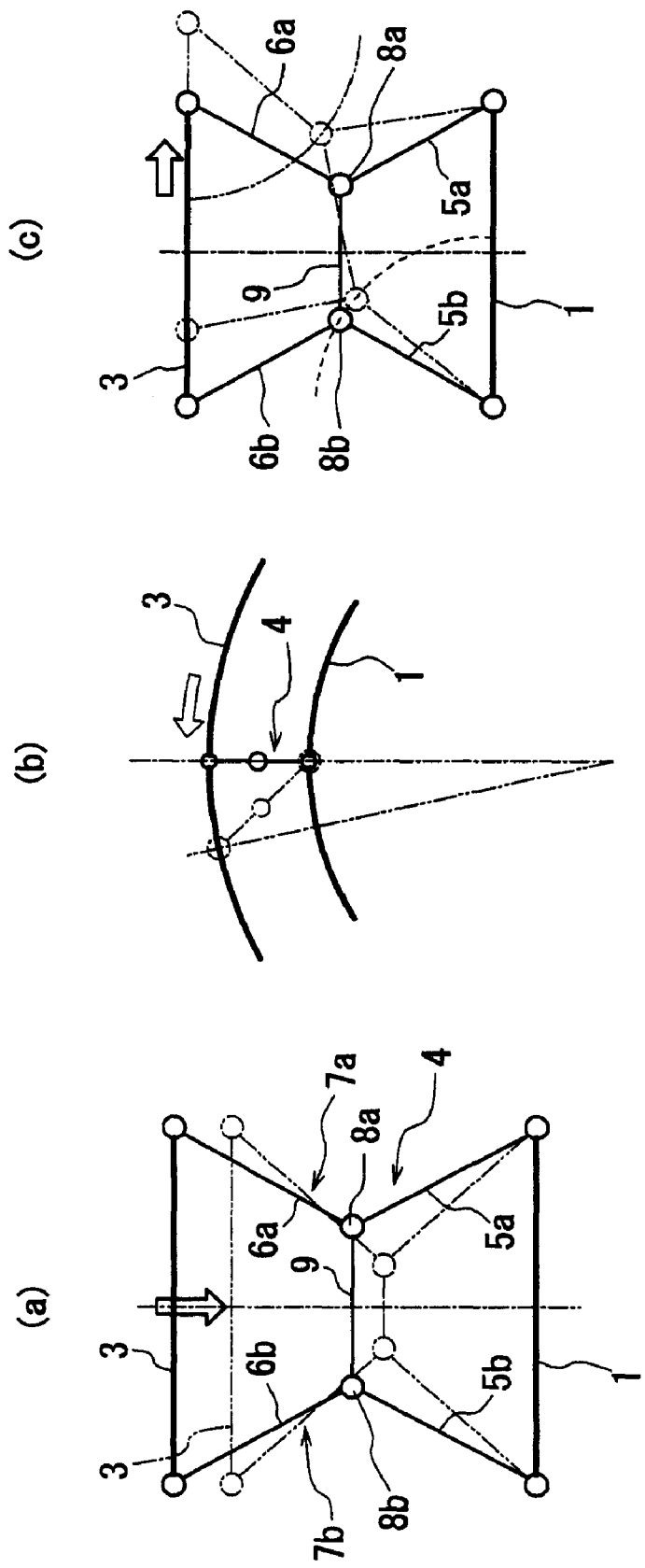
FIG. 4 is a view for illustrating the action of the spring member.

Furthermore, when the rim member 1 and the ring member 3 are relatively displaced in the width direction as shown in FIG. 4(*c*), the spring member 9 is subjected to a tensile deformation under swing displacements of the links 5*a* and 6*a*, 5*b* and 6*b* at the hinge connections 8*a*, 8*b*, respectively. As a result, the spring member 9 imparts a required lateral stiffness due to the tensile reaction force.

Figure 5:
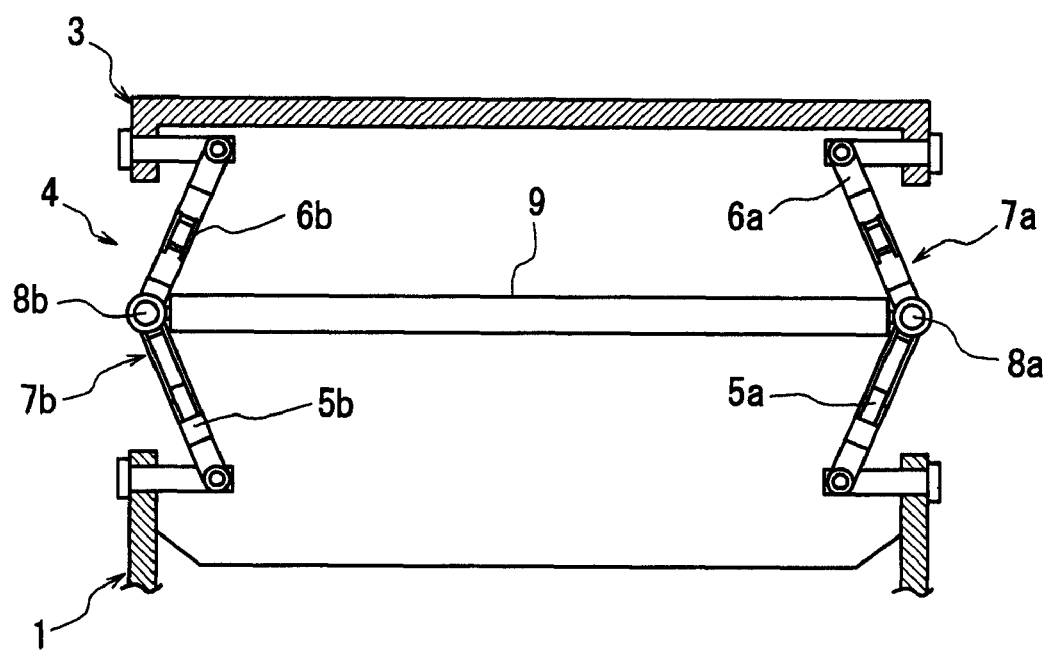
FIG. 5 is a sectional view in the radial direction showing a modified embodiment of the link mechanism.

As shown in FIG. 5, the link mechanisms 4 may be so configured that the hinge connections 8*a*, 8*b* of the link members 7*a*, 7*b*, respectively, are laid to protrude outwardly in the width direction, which is opposite of the configuration shown in FIG. 3. In this case, the spring member 9 joining the hinge connections 8*a*, 8*b* produces a tensile reaction force against an approaching displacement of the rim member 1 and the ring member 3, produces a compressive reaction force against a relative displacement of the rim member 1 and the ring member 3 in the circumferential direction and produces a compressive reaction force against a relative displacement of the rim member 1 and the ring member 3 in the width direction. In each case, the spring member 9 functions to yield a required stiffness.

In such a non-pneumatic tire, when another elastic means consisting of a torsion member (not shown) such as a torsion spring member, a rubber bushing and a torsion bar which is arranged at the connection of the first end of at least one of the links 5a and 6a, 5b and 6b of the link members 7a, 7b and which impart a stiffness against swing displacements of the link in the circumferential direction is provided, the longitudinal stiffness of the tire can be arbitrarily increased by a torsional reaction force of the torsion spring member on the occasion of a relative displacement of the rim member 1 and the ring member 3 in the circumferential direction as shown in FIG. 4(*b*). This is also applied to an opposite relative displacement in the circumferential direction.

Figure 6:
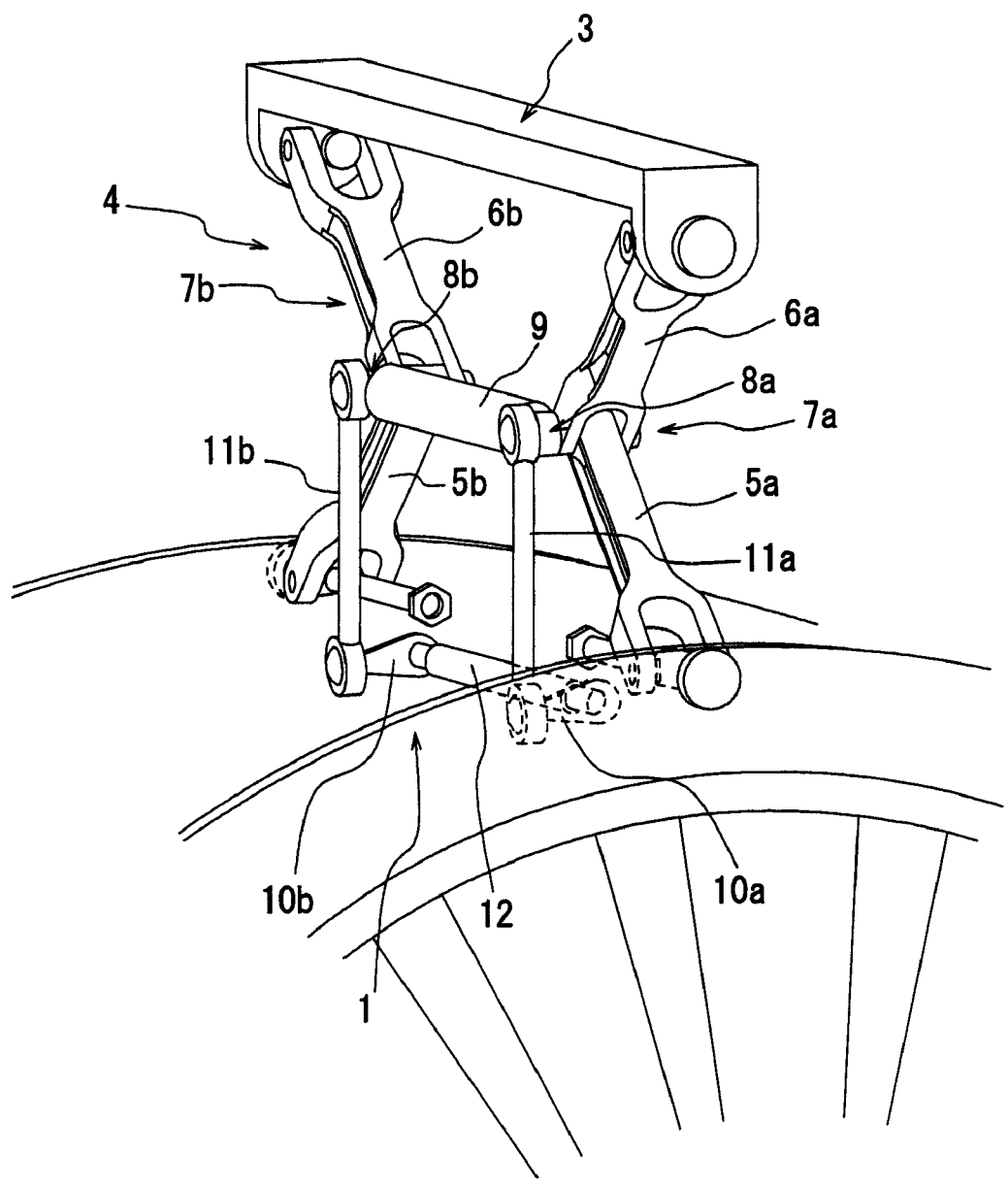
FIG. 6 is a perspective view of a primal part of another elastic member consisting of a torsion bar.

In this tire, when a further elastic means consists of a torsion bar 12 disposed between the respective hinge connections 8a, 8b of the second ends of the links 5a and 6a, 5b and 6b of the pair of link members 7a, 7b via a pair of connecting rods 11a, 11b, as shown in FIG. 6 of a perspective view of its primal part, instead of or in addition to the above-mentioned another elastic means consisting of the torsion spring member, the torsion bar 12 is torsionally deformed, as shown in FIG. 7(*b*), by the moment arms 10a, 10b of the pair of connecting rods 11a, 11b, respectively, due to the change of the radial height, as shown by an imaginary line in FIG. 7(*a*), of the hinge connections 8a, 8b on the occasion of the relative displacement of the rim member 1 and the ring member 3 in the width direction. As a result, the lateral stiffness of the tire can be increased as required by a torsional reaction force of the torsion bar 12. Of course, the torsion bar 12 can function in the same manner against the relative widthwise displacement opposed to the illustrated direction.

In another embodiment of a non-pneumatic tire according to the present invention, instead of providing the above-mentioned spring member 9 as an elastic means, torsion spring members (not shown) imparting a stiffness against swing displacements of the links 5a and 6b, 5b and 6b in the meridian direction are provided between the hinge connections 8a, 8b of the second ends of the link 5a and 6a, 5b and 6b of the pair of link members 7a, 7b, respectively. The torsion spring members in this embodiment can provide required vertical, longitudinal and lateral stiffnesses to the tire on the basis of swing displacements of the links 5a and 6a, 5b and 6b in the same manner as mentioned above for the spring member 9.

That is, during an approaching displacement of the rim member 1 and the ring member 3 in the radial direction, the radial lengths of the link members 7a, 7b get shorter so that the above-mentioned torsion spring member produces a torsional reaction force, and during a relative displacement of the above-mentioned both ends 1, 3 in the circumferential direction, the entire lengths of the link members 7a, 7b, in contrast, get longer so that the torsion spring member produces a torsional reaction force, and for the relative displacement of the above-mentioned both members 1, 3 in the width direction, the crossing angles of the links change at the hinge connections 8a, 8b of the link members 7a, 7b, respectively, as shown in FIGS. 4(*c*) and 7(*a*) so that the torsional spring members produce torsional forces. Production of these reaction forces imparts the vertical, longitudinal and lateral stiffness of the tire.

In such a tire provided at the hinge connections 8a, 8b with the not-shown torsion spring member, when another torsion spring member imparting a stiffness against a swing displacement of the link in the circumferential direction is arranged at a connection of the first end of at least one of the links 5a and 6a, 5b and 6b of the link members 7a, 7b, the longitudinal stiffness of the tire can be enhanced as required against the relative displacement of the rim member 1 and the ring member 3 in the circumferential direction as shown in FIG. 4(*b*) by the torsional reaction force produced by the another torsion spring member.

Instead of or in addition to providing the above-mentioned another torsion spring member, as mentioned above with reference to the FIG. 6, a torsion bar 12 may be disposed between the respective hinge connections 8a, 8b of the links 5a and 6a, 5b and 6b of the pair of link members 7a, 7b via a pair of connecting rods 11a, 11b having moment arms 10a, 10b. Thus, the lateral stiffness of the tire can be appropriately enhanced by the torsional reaction force produced by the torsion bar 12, as mentioned above with reference to FIG. 7.

In a further embodiment, an appropriate elastic means imparting a stiffness against relative displacement of the rim member 1 and ring member 3 in the radial and circumferential directions is provided on the link mechanisms 4. In addition, a torsion bar is disposed between the respective hinge connections 8a, 8b of the second ends of the links 5a and 6a, 5b and 6b of the pair of link members 7a, 7b via a pair of connecting rods 11a, 11b having moment arms 10a, 10b, as mentioned above with reference to FIG. 6.

Thus, this tire corresponds to the tire as shown in FIG. 6 except that the spring member 9 is substituted with a not-shown appropriate elastic means. The above-mentioned elastic means may consist of a torsion spring member which is arranged at the connection of the first end of at least one of the links 5a and 6a, 5b and 6b of the link members 7a, 7b and which imparts a stiffness against swing displacements of the links in both of the meridian and circumferential directions, or a combination of a torsion spring member which is arranged at the connection of the first end of at least one of the links 5a and 6a, 5b and 6b of the link members 7a, 7b and which imparts a stiffness against swing displacements of the links in both of the meridian and circumferential directions and another torsion member which is arranged at the connection of the first end of the other links and which imparts a stiffness against a swing displacement of the link in the circumferential direction.

Accordingly, in this tire, the vertical and longitudinal stiffnesses of the tire can be imparted through the deformation reaction force of the elastic means consisting of the torsion spring member or the like, and the lateral stiffness can be imparted through the torsion reaction force of the torsion bar 12.

Figure 8:
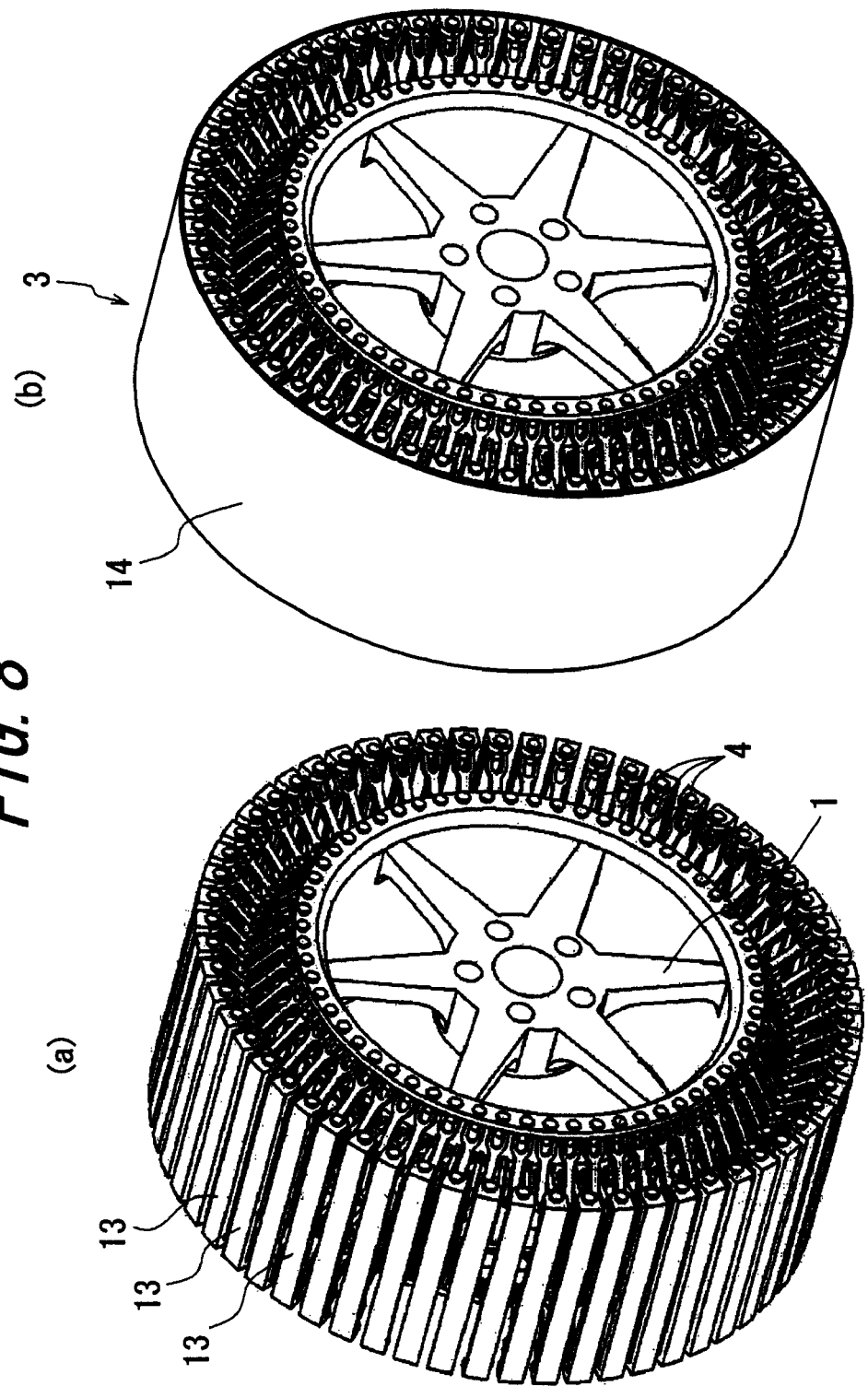
FIG. 8 is a perspective view of a modified embodiment of the ring member.

FIG. 8 is a perspective view of a modified embodiment of the ring member. In this embodiment, the link mechanisms 4 are coupled at the first ends with the side of the rim member 1, and at the second ends with ends of a plurality of segments 13 in their extending directions which are aligned in the circumferential direction with small spaces therebetween. An elastic ring 14 such as a belt is bonded on the circumferential face of the segments 13. In this way, the segments 13 and the elastic ring 14 constitute the ring member 3.

Figure 2:
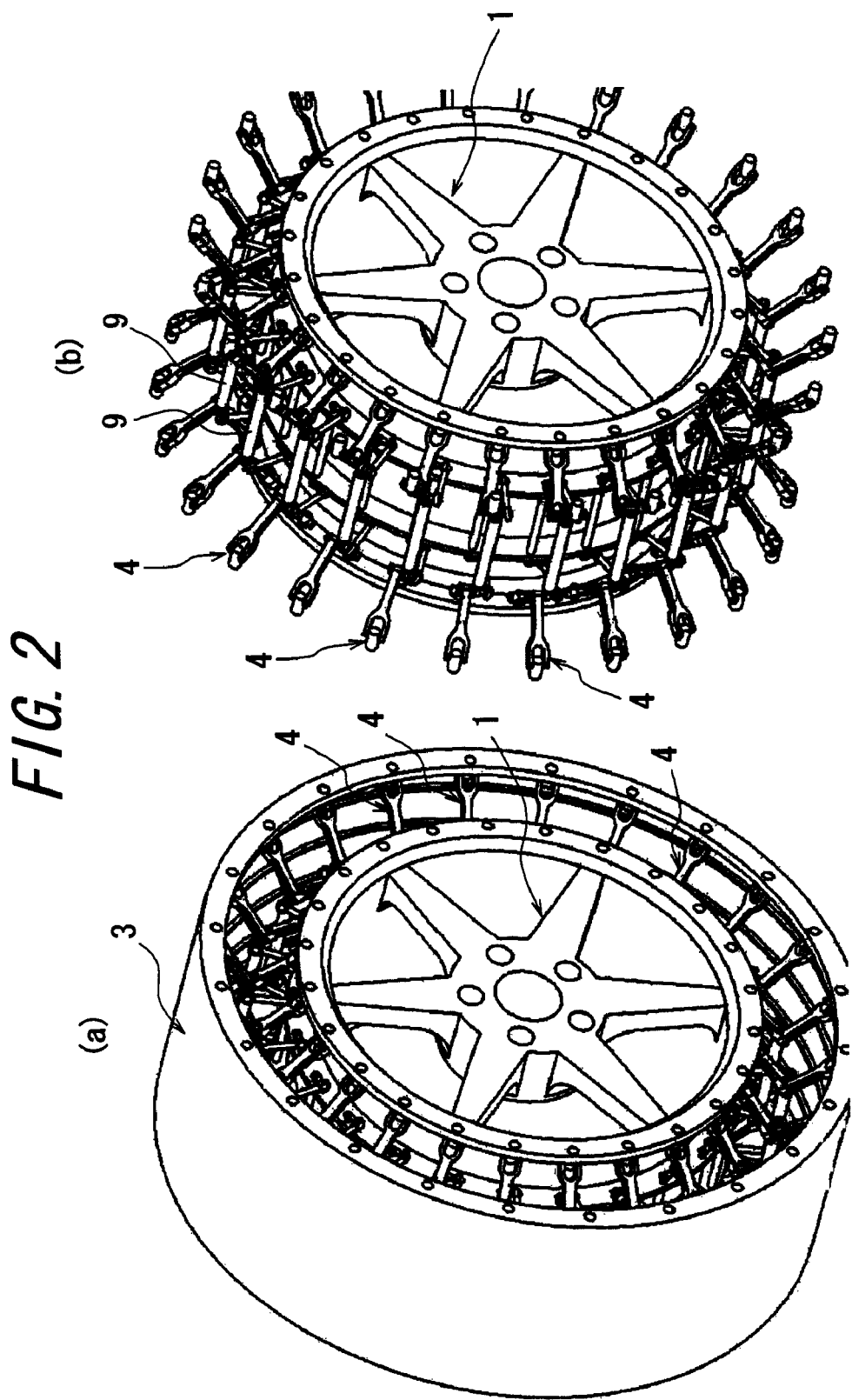
FIG. 2(*a*) is a perspective view of the non-pneumatic tire shown in FIG. 1 with the tread being removed from the tire.

A non-pneumatic tire having a tread formed on the circumferential face of the ring member 3 can have lower stiffness of the ring member 3 than that of the tire shown in FIGS. 1 and 2, so that larger grounding area of the tire during a rotation under load can be ensured.

In this tire also, the desired vertical, longitudinal and lateral stiffnesses of the tire can be mutually independently and easily obtained by imparting a required stiffness against relative displacements of the rim member 1 and the ring member 3 in the radial, circumferential and width directions with any of the above-mentioned means.

There has been discussed a case where radial, circumferential and width displacements are produced independently with each other between the rim member 1 and the ring member 3. The tire according to the present invention, however, can naturally impart the desired stiffnesses simultaneously and multiply even in a case where two or more kinds of the relative displacement simultaneously occur.

EXAMPLE 1

A conventional pneumatic tire of the size 225/55ZR17 (internal air pressure: 230 kPa) is prepared as a control and Example tires 1 and 2 of the same size of the control tire are also prepared. For these tires, weight, riding comfort, driveability and rolling resistance are measures. The results are shown in Table 1.

Example tire 1 has a basic structure as shown in FIGS. 1 and 2, and has a torsion bar 12 in addition to a coil spring as a spring member 9. Example tire 2 has a basic structure as shown in FIG. 8, and additionally has the same spring member 9 and a torsion bar 12. Further, both of Example tires 1 and 2 is provided with a torsion bar at the connections of the links 5a, 5b to the rim member 1.

The riding comfort is evaluated from a feeling obtained by an actual vehicle traveling test in which the tire wheel is mounted on a passenger vehicle of 3000 cc displacement and tested under a load condition corresponding to two passengers. The driveability is evaluated by a driver from a sensory feeling under the above-mentioned test condition.

For the rolling resistance of the tire, the tire wheel is rotated on a test drum machine at 80 km/h under an action of a load of 4.0 kN and a resistance transmitted to a drum shaft is measured to give the rolling resistance. In Table 1, the results are indicated in index values and the larger index value except for the weight means a better result. Regarding the weight, the heavier tire has the larger index value.

|  | Weight (Index) | Riding comfort (Index) | Driveability (Index) | Rolling resistance (Index) |
| --- | --- | --- | --- | --- |
| Conventional tire | 100 | 100 | 100 | 100 |
| Example tire 1 | 106 | 95 | 95 | 115 |
| Example tire 2 | 108 | 102 | 105 | 105 |

From the results as shown in Table 1, it is appreciated that Example tire 1 has a superior rolling resistance but a slightly inferior riding comfort due to its higher ring stiffness and a smaller deformation of the tread grounding portion, and has a slightly inferior driveability due to its smaller grounding area. It is also appreciated that Example tire 2 can simultaneously improve the riding comfort and driveability since it can enhance the lateral and longitudinal stiffnesses while suppressing the vertical stiffness to, thereby, ensure a sufficient grounding area.

The invention claimed is:

1. A non-pneumatic tire comprising a rim member, a ring member disposed at an outer circumferential side of the rim member and provided with a tread on a circumferential face, and a plurality of link mechanisms circumferentially spaced at a given distance and coupling the rim member with the ring member, wherein each of the link mechanisms comprises a pair of link members, each of the link members comprises a link which is connected at a first end with a side portion of the rim member and which is swingable in the meridian direction and in the circumferential direction and another link which is connected at a first end with a side portion of the ring member and which is swingable in the meridian direction and in the circumferential direction with respective second ends of the links being hingedly connected to one another to make the links swingable in the meridian direction, and elastic means for imparting a stiffness against relative displacements in the radian, circumferential and width directions with respect to the rim and ring members, the elastic means being connected to the link mechanisms, wherein the elastic means comprises a spring member connecting respective hinge connections of the second ends of the links of the pair of link members with each other, wherein the elastic means also comprises a torsion bar disposed between the respective hinge connections of the second ends of the links of the pair of link members by a pair of connecting rods each having a moment arm, such that a first moment arm and a second moment arm is provided, and wherein the torsion bar is connected at one end to the first moment arm and is connected at another end to the second moment arm.

2. A non-pneumatic tire comprising a rim member, a ring member disposed at an outer circumferential side of the rim member and provided with a tread on a circumferential face, and a plurality of link mechanisms circumferentially spaced at a given distance and coupling the rim member with the ring member, wherein each of the link mechanisms comprises a pair of link members, each of the link members comprises a link which is connected at a first end with a side portion of the rim member and which is swingable in the meridian direction and in the circumferential direction and another link which is connected at a first end with a side portion of the ring member and which is swingable in the meridian direction and in the circumferential direction, with respective second ends of the links being hingedly connected to one another to make the links swingable in the meridian direction, wherein a torsion bar is disposed between the respective hinge connections of the second ends of the links of the pair of link members by a pair of connecting rods each having a moment arm, such that a first moment arm and a second moment arm is provided, wherein the torsion bar is connected at one end to the first moment arm and is connected at another end to the second moment arm.

3. A non-pneumatic tire comprising a rim member, a ring member disposed at outer circumferential side of the rim member and provided with a tread on a circumferential face, and a plurality of link mechanisms circumferentially spaced at a given distance and coupling the rim member with the ring member, wherein each of the link mechanisms comprises a pair of link members, each of the link members comprises a link which is connected at a first end with a side portion of the rim member and which is swingable in the meridian direction and in the circumferential direction and another link which is connected at a first end with a side portion of the ring member and which is swingable in the meridian direction and in the circumferential direction, with respective second ends of the links being hingedly connected to one another to make the links swingable in the meridian direction, an elastic means imparting a stiffness against relative displacements in the radian, circumferential and width directions with respect to the rim and ring members is provided on the link mechanisms, and a torsion bar is disposed between the respective hinge connections of the second ends of the links of the pair of link members by a pair of connecting rods each having a moment arm, such that a first moment arm and a second moment arm is provided, wherein the torsion bar is connected at one end to the first moment arm and is connected at another end to the second moment arm.

* * * * *